(12) United States Patent
Palus

(10) Patent No.: US 6,357,987 B1
(45) Date of Patent: Mar. 19, 2002

(54) POWERED WHEEL CHOCK WITH FOLDING SUPPORTS

(75) Inventor: Thomas J. Palus, Cedarburg, WI (US)

(73) Assignee: Kelley Company, Inc., Mequon, WI (US)

( * ) Notice: Subject to any disclaimer, the term of this patent is extended or adjusted under 35 U.S.C. 154(b) by 0 days.

(21) Appl. No.: 09/473,764

(22) Filed: Dec. 29, 1999

(51) Int. Cl.[7] .............................................. B65G 67/02
(52) U.S. Cl. ........................................ 414/401; 188/32
(58) Field of Search ................................ 414/396, 401, 414/426, 430, 584; 410/30; 188/32, 36

(56) References Cited

U.S. PATENT DOCUMENTS

| | | |
|---|---|---|
| 1,102,773 A | 7/1914 | Martin |
| 3,305,049 A | 2/1967 | Willey |
| 3,542,157 A | 11/1970 | Noah |
| 4,080,904 A | 3/1978 | Lofink et al. |
| 4,207,019 A | 6/1980 | Cone |
| 4,216,724 A | 8/1980 | Grillet |
| 4,572,080 A | 2/1986 | Williams et al. |
| 4,969,792 A | 11/1990 | Ellis et al. |

(List continued on next page.)

FOREIGN PATENT DOCUMENTS

| | | |
|---|---|---|
| CA | 1308222 | 10/1992 |
| DE | 583404 | 9/1933 |
| EP | 537075 A1 | 4/1993 |
| EP | 0 537 075 B1 | 4/1993 |
| EP | 0 580 415 A1 | 1/1994 |
| EP | 0 384 850 B1 | 11/1994 |
| EP | 0 639 488 A1 | 2/1995 |
| FR | 2 284 481 | 4/1976 |
| FR | 2 652 340 | 3/1991 |

(List continued on next page.)

OTHER PUBLICATIONS

"Notice Technique CDC 4000" manual published by Michel Roux starting in Dec., 1991 or earlier and translation.
"Equipements Servoquai" brochure published by Michel Roux starting in Mar., 1991 or earlier, and translation.
"Les Hommes, Les Vehicules, Le Quai" brochure published by Michel Roux staring in Nov., 1991 or earlier, and translation.
"Descriptif Technique, Descriptif de Fonctionnement, & Caracteristiques Techniques" brochure published by Michel Roux starting in Oct., 1991 or earlier, and translation.
"Amenagement de Quais Industriels" brochure published by Michel Roux starting in Nov., 1991 or earlier, and translation.
Photographs published by Michel Roux in 1991.

Primary Examiner—James W. Keenan
(74) Attorney, Agent, or Firm—Michael Best & Friedrich LLP

(57) ABSTRACT

A wheel-chocking device including a base member and a collapsible chock movable between lowered and raised positions. The chock includes a chocking member movable relative to the base member, and support members pivotably attached to the chocking member and defining therewith pivot axes, the pivot axes and the chocking member being movable between a substantially horizontal orientation and an inclined orientation. The chocking member and the support members are substantially coplanar when the chock is in the lowered position. The chocking member and the support members are inclined and the chocking member is substantially perpendicular to the support members when the chock is in the raised position. The base member has a longitudinal axis defining a vertical plane, and the pivot axes are substantially parallel to the vertical plane. The wheel chocking device also has a support member guide system including a first guide affixed to the base member for directing a support member toward the inclined orientation as the chocking member moves in a first direction, and a second guide affixed to the base member for directing a support member toward the horizontal orientation as the chocking member moves in a second direction opposite the first direction.

12 Claims, 6 Drawing Sheets

U.S. PATENT DOCUMENTS

| | | |
|---|---|---|
| 5,173,018 A | 12/1992 | Kissel et al. |
| 5,249,905 A | 10/1993 | Warner et al. |
| 5,375,965 A | 12/1994 | Springer et al. |
| 5,553,987 A * | 9/1996 | Ellis .......................... 414/401 |
| 5,582,498 A * | 12/1996 | Springer et al. ............ 414/401 |
| 5,743,697 A | 4/1998 | Alexander et al. |
| 5,762,459 A * | 6/1998 | Springer et al. ............ 414/401 |
| 5,896,957 A | 4/1999 | Berends et al. |
| 5,927,928 A | 7/1999 | Hageman et al. |
| 5,934,857 A | 8/1999 | Alexander |
| 6,092,970 A * | 7/2000 | Hahn et al. .................. 414/401 |
| 6,250,432 B1 * | 6/2001 | Hageman et al. ............. 188/32 |
| 6,276,496 B1 * | 8/2001 | Hagemann et al. ........... 188/32 |

FOREIGN PATENT DOCUMENTS

| | | |
|---|---|---|
| FR | 2 682 343 | 4/1993 |
| IT | 526008 | 3/1958 |
| SU | 1754545 A1 | 8/1992 |
| WO | WO95/18029 | 7/1995 |
| WO | WO97/49626 | 12/1997 |

\* cited by examiner

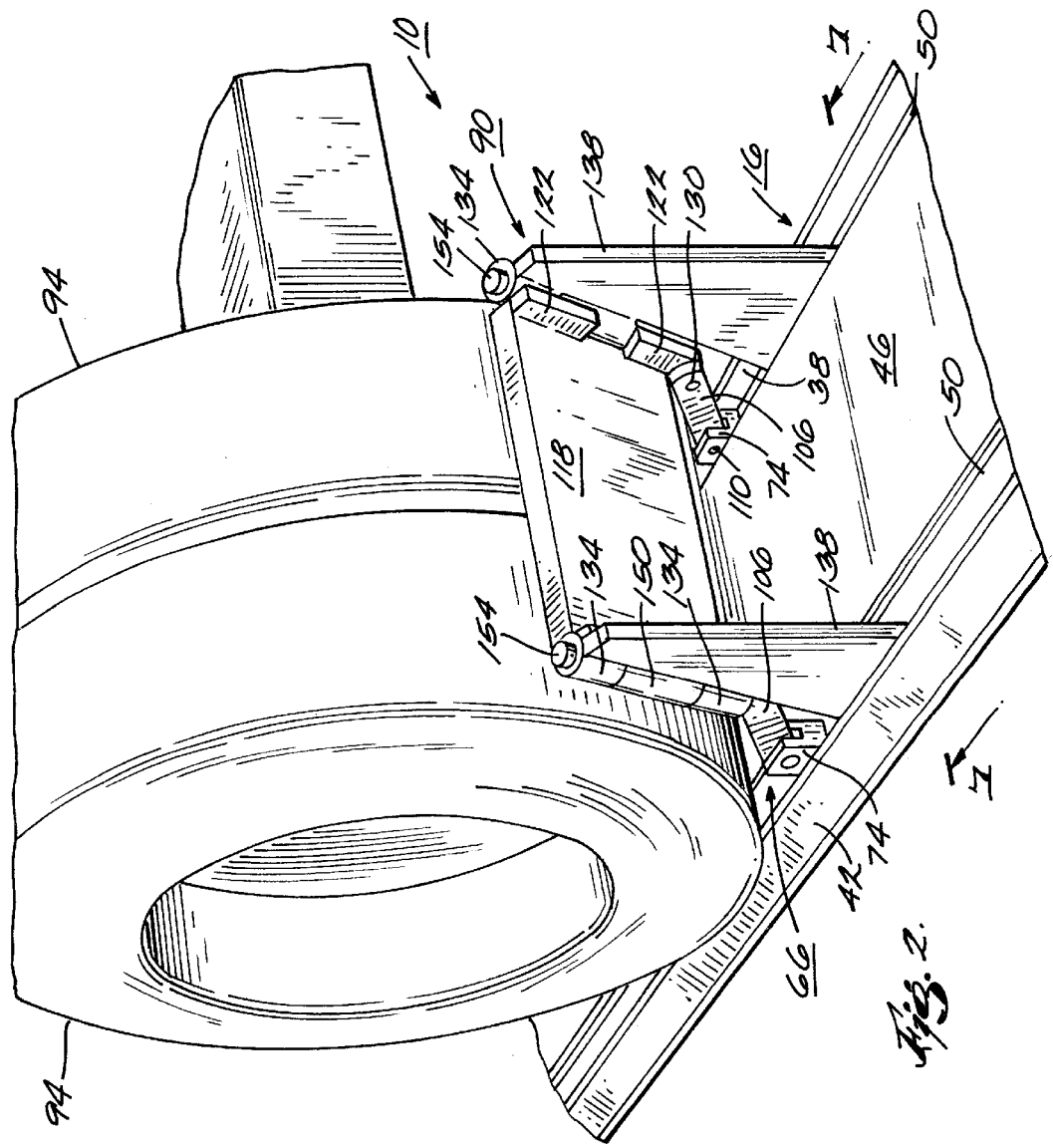

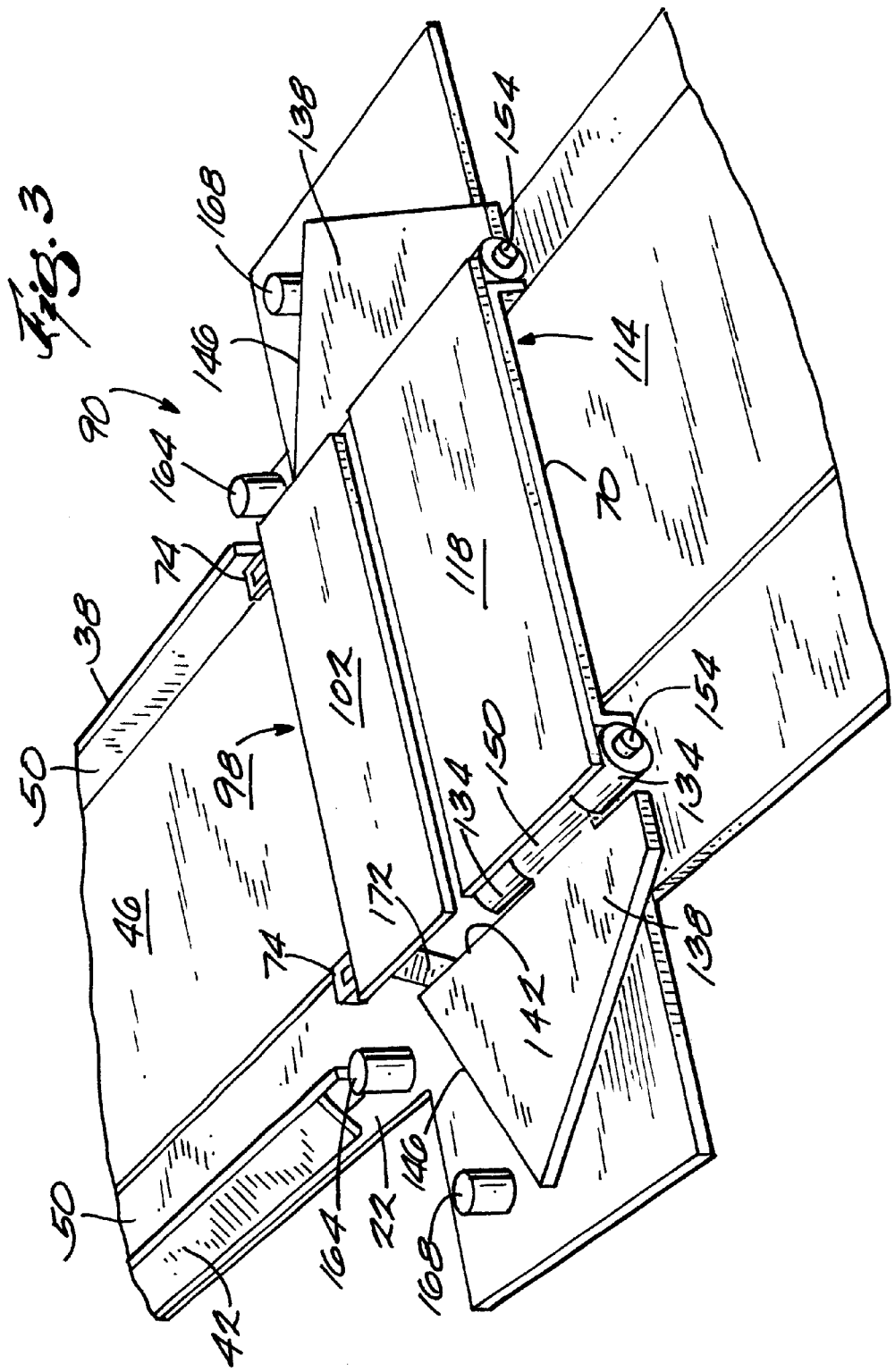

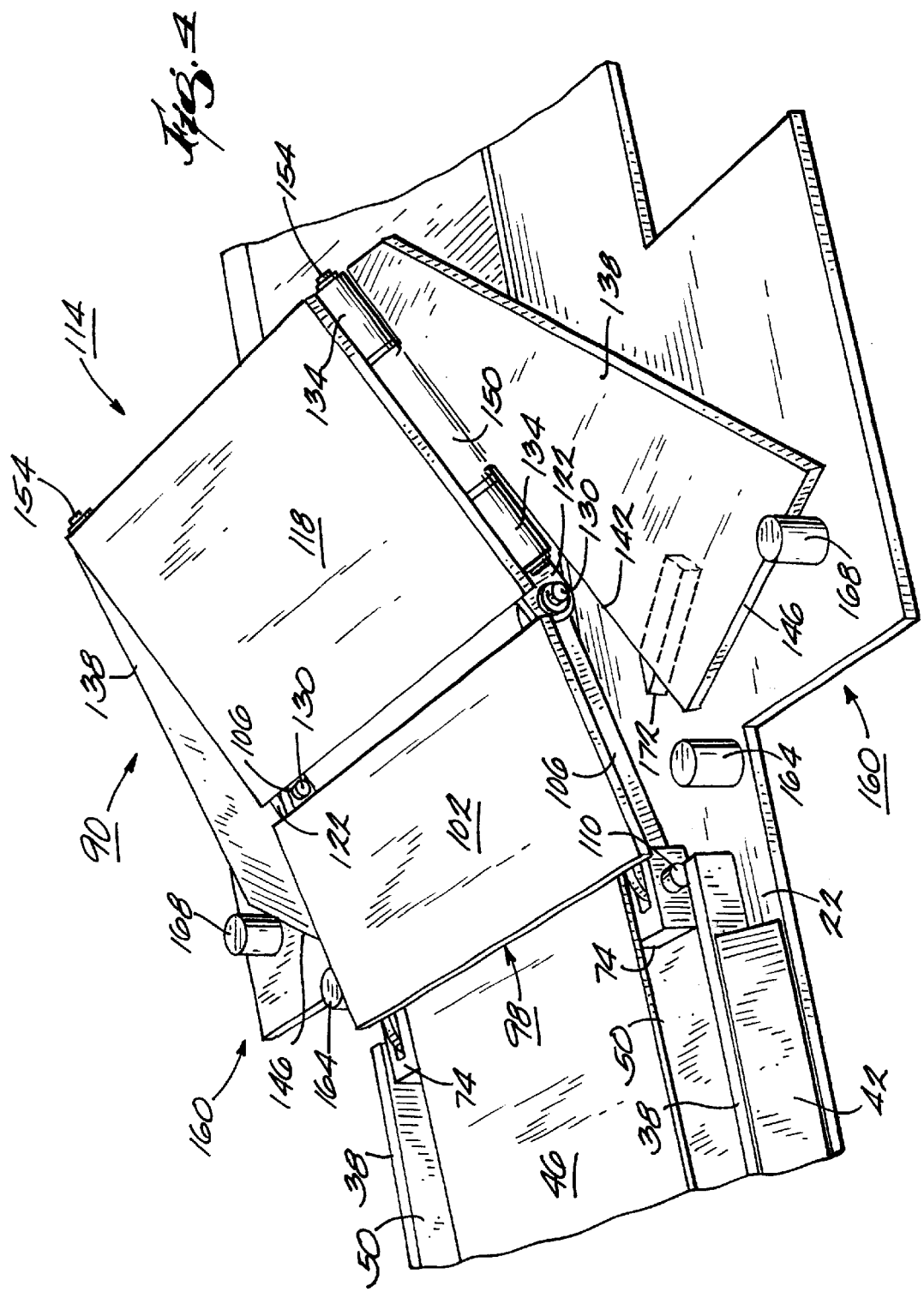

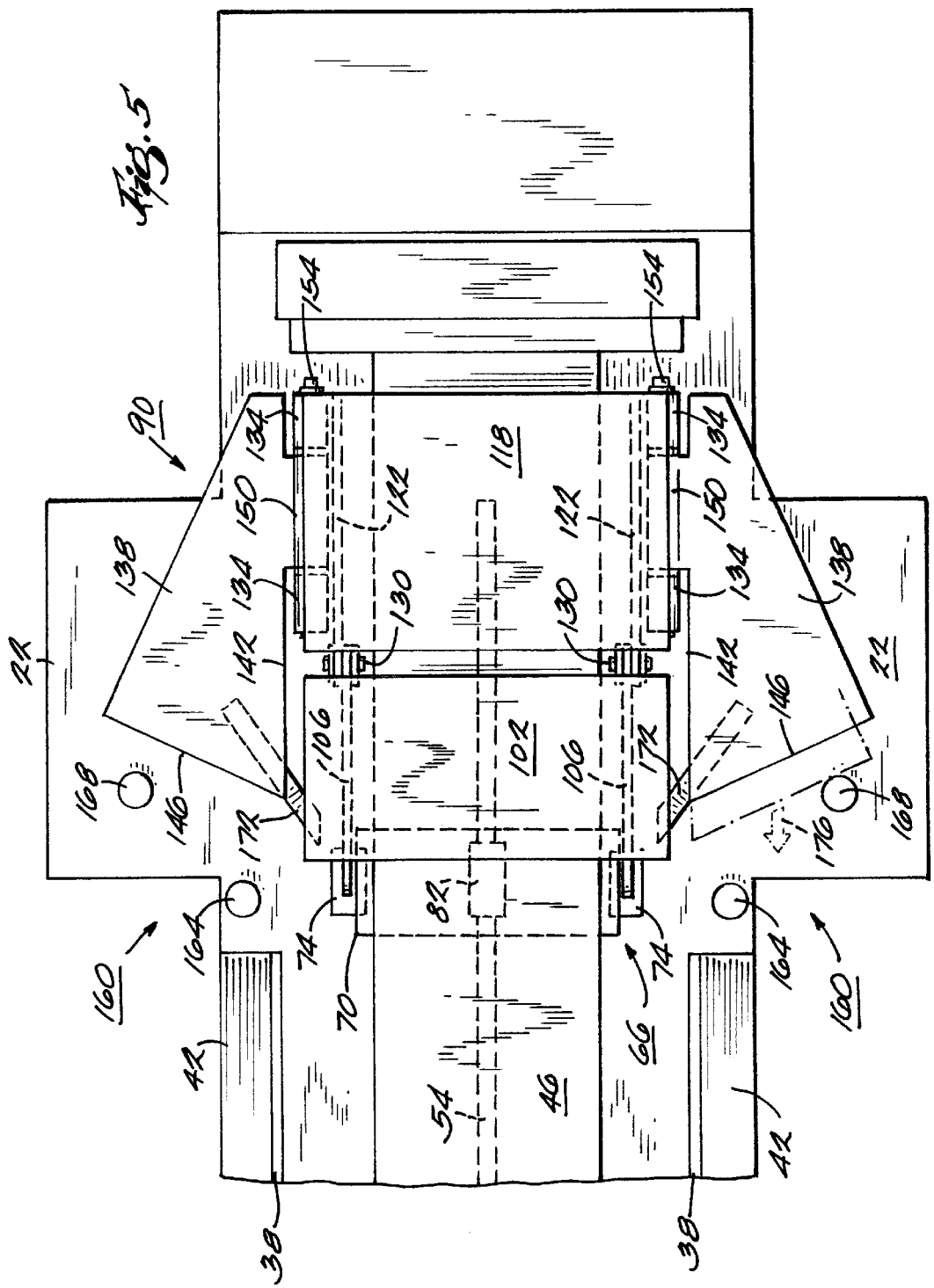

POWERED WHEEL CHOCK WITH FOLDING SUPPORTS

FIELD OF THE INVENTION

The present invention generally relates to the field of vehicle restraining devices that prevent movement of a vehicle away from a desired location. More specifically, the present invention relates to powered wheel chocking devices.

BACKGROUND OF THE INVENTION

Powered wheel chocking devices have been developed to allow a vehicle (e.g., a straight truck, a trailer with or without a tractor, etc.) to be secured at a desired location (e.g., a loading dock) so that loading, unloading, or other operations can be performed without risk that the vehicle will unexpectedly move away. Such wheel chocking devices typically include a chock that can be selectively moved by a drive mechanism between a chocked position and an unchecked position. These devices are commonly provided with visual and/or audible signals that indicate when the chock is in the chocked position and when the chock is in an unchocked position.

One type of wheel chocking device is illustrated in U.S. Pat. No. 5,249,905 to Warner et al. The Warner device includes a below-ground power mechanism (e.g., and electric motor) and a below-ground drive mechanism (e.g., a drive screw) that drive a wheel chock. The wheel chock is designed to be stored below ground level, and will be raised to an above-ground position as it is moved toward the vehicle wheel.

Another type of powered wheel chocking device has been designed by Michel Roux, and is disclosed in European Patent Publication No. 537,075. The Roux device includes a chock that is movable between an unchecked lowered position and chocked raised position. The Roux device is designed to maintain the chock in a lowered position until the chock has been moved longitudinally into contact with the vehicle wheel. After contact with the vehicle wheel, further movement of the drive mechanism causes the chock to pivot to the raised position to secure the vehicle wheel.

A similar device is disclosed in U.S. Pat. No. 5,375,965 to Springer et al. The Springer device also includes a chock that is movable between lowered and raised positions, and the chock is designed to be moved longitudinally into contact with the vehicle wheel while the chock is in the lowered position. After contact with the wheel, the drive mechanism will continue to drive a portion of the chock until the chock moves to the raised position.

SUMMARY OF THE INVENTION

The present invention provides a wheel-chocking device including a base member and a collapsible chock coupled to the base member and movable between lowered and raised positions. The chock includes a chocking member movable relative to the base member, and a support member pivotably attached to the chocking member and defining therewith a pivot axis. The pivot axis and the chocking member are movable between a substantially horizontal orientation and an inclined orientation. In one embodiment, the chocking member and the support member are substantially coplanar when the chock is in the lowered position, and the chocking member and the support member are inclined and substantially perpendicular to each other when the chock is in the raised position. Preferably, the base member has a longitudinal axis that defines a vertical plane at the axis, and the pivot axis is substantially parallel to the vertical plane.

In another embodiment, the wheel-chocking device further includes a support member guide system that guides the support member between the inclined and horizontal orientations. The guide system can include a first guide affixed to the base member for directing the support member toward the inclined orientation as the chocking member moves in a first direction, and a second guide affixed to the base member for directing the support member toward the horizontal orientation as the chocking member moves in a second direction opposite the first direction.

The present invention is also embodied in a method of chocking a vehicle wheel at a loading dock having a driveway. The method includes the steps of positioning the chocking member in the collapsed position above the driveway, rolling the vehicle over the collapsed chocking member, stopping the vehicle at the loading dock, raising the chocking member to the raised position, moving the raised chocking member toward a wheel of the vehicle, and contacting the raised chocking member with the vehicle wheel after the raising step. In one embodiment, the chocking member is coupled to a drive mechanism, and the moving step includes driving the drive mechanism. Preferably, the drive mechanism is coupled to a power mechanism, and the driving step includes activating the power mechanism.

BRIEF DESCRIPTION OF THE DRAWINGS

FIG. 2 is an enlarged perspective of the wheel chocking device of FIG. 1 in a raised position.

FIG. 3 is a perspective view of the wheel chocking device of FIG. 1 in a lowered position.

FIG. 4 is a perspective view of the wheel chocking device of FIG. 1 in a partially raised position.

FIG. 5 is a plan view of the wheel chocking device of FIG. 1 in the lowered position.

Figure 1:
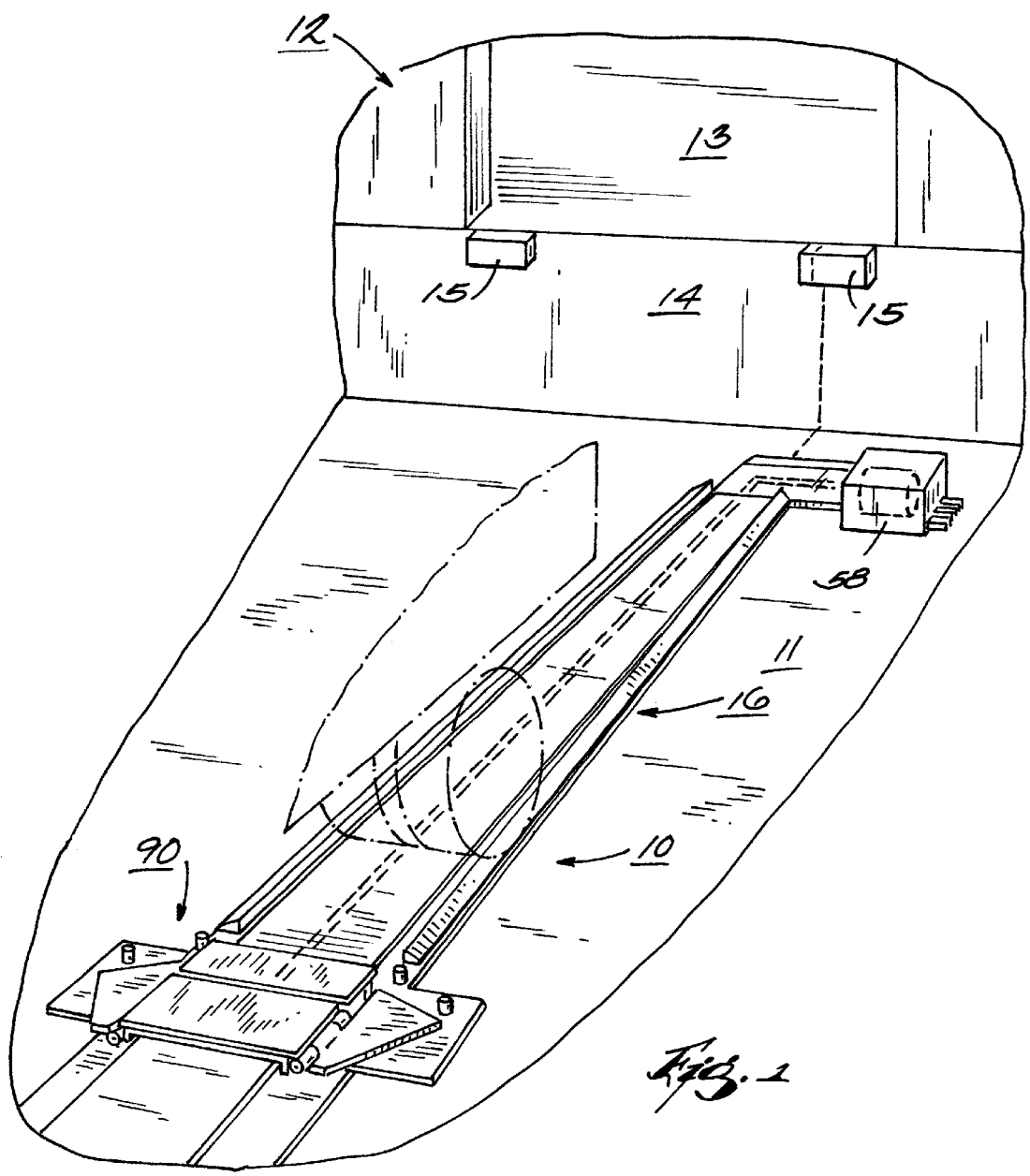
FIG. 1 is a perspective view of a wheel chocking device embodying the present invention mounted at a loading dock.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a wheel chocking device 10 embodying the present invention. The wheel chocking device 10 has some elements similar to the device described in U.S. Pat. No. 6,250,432, which is assigned to the assignee hereof, and which is herein incorporated by reference.

As shown in FIG. 1, the wheel chocking device 10 is installed on a driveway 11 leading to a loading dock 12. The loading dock 12 includes a generally horizontal deck 13, a generally vertical face 14, and bumpers 15. A truck backs over the wheel chocking device 10 toward the vertical face 14 to allow goods to be loaded or unloaded between the truck and the deck 13. The wheel chocking device 10 holds the truck in place adjacent the loading dock 12 such that the truck cannot leave the loading dock 12 prematurely.

The wheel chocking device 10 includes a guide mechanism in the form of an elongate base member 16 having a longitudinal axis. The base member 16 is mounted above-grade on the loading dock-area pavement.

Figure 7:
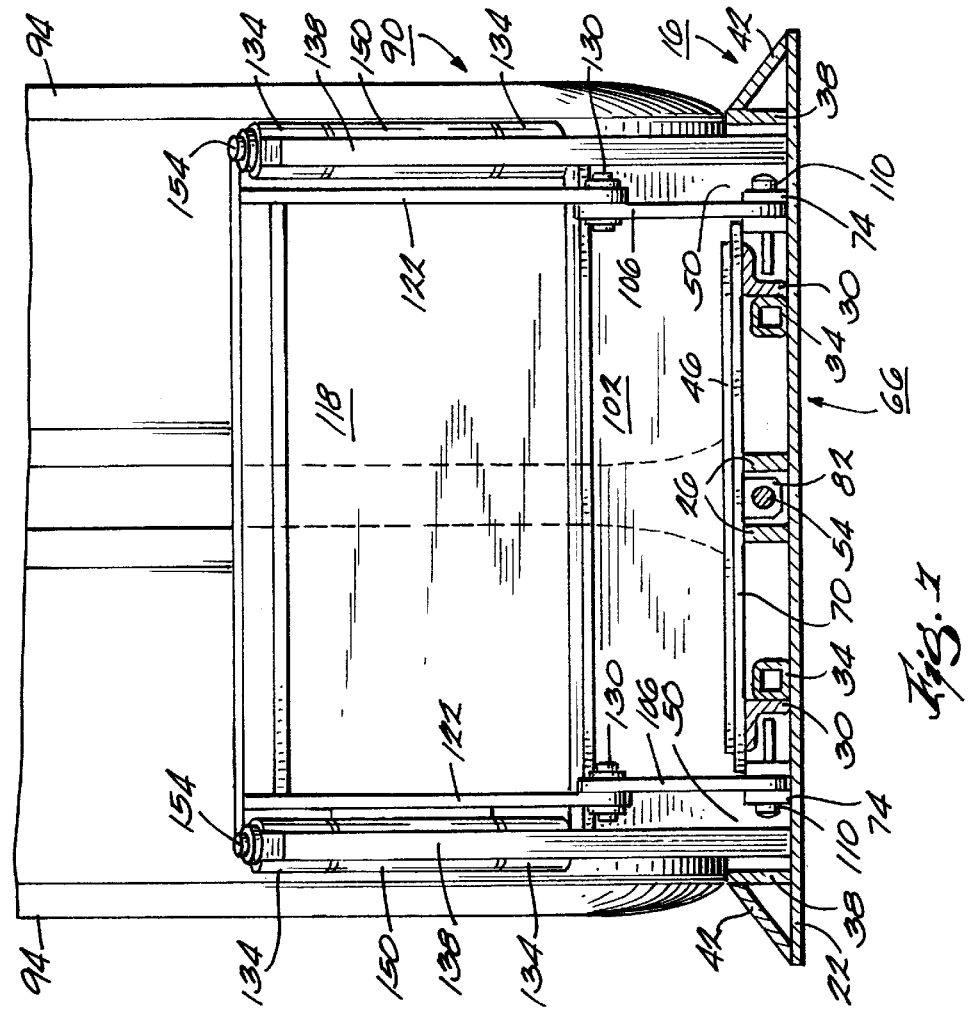
FIG. 7 is an elevation front view of the wheel chocking device of FIG. 1 taken along the 7—7 line of FIG. 2.

As best illustrated in FIG. 7, the base member 16 includes an elongated flat plate 22, a pair of inner rails 26, and a pair outer rails 30 that extend along substantially the entire length of the flat plate 22 substantially parallel to the longitudinal axis. The base member 16 also includes a pair of outer rail supports 34 that connect the outer rails 30 to the flat plate 22, and guide tracks 38 that extend partially along the length of the flat plate 22 substantially parallel to the longitudinal axis. The base member 16 is mounted directly to the upper surface of the driveway. The base member 16 has a low profile with angled sides 42 that allow plowing of the driveway area with a minimum of interference. The base member 16 also includes angled ends (not shown) to facilitate a truck moving over the base member 16. The angled end away from a loading dock 12 is the front end.

A floating cover 46 extends substantially along the entire length of the base member 16. The cover 46 is referred to as a floating cover because the cover 46 is fastened to the base member 16 only at the extreme ends of the cover 46. The cover 46 can be lifted locally at any point along the cover 46, except at the extreme ends, yet still remain in place. When not being lifted, the cover 46 is supported by the inner and outer rails 26, 30. The cover 46 does not extend completely across the base member 16 in a transverse direction. A gap is left between the edges of the cover 46 and the guide tracks 38 to form guide slots 50 between the cover 46 and the guide tracks 38.

The wheel chocking device 10 also includes a drive mechanism having an acme screw drive 54 (see FIG. 5) extending substantially the length of the base member 16 between the inner rails 26 and rotatably attached to the ends of the base member 16. The screw drive 54 has a longitudinal axis defining a vertical plane. The advantages of using only one acme screw 54 is a simpler, more cost efficient drive, less maintenance, and easier motor controls. The floating cover 46 protects the drive system from debris. Any other suitable drive system may be used in the place of the drive system described herein. Heat tape can be used inside the base member 16 to keep snow and ice off of and out of the drive system and track area.

In another embodiment (not shown), the base member 16 can be the driveway or paved surface itself. In still another embodiment (not shown), the base member 16 can be installed below grade such that the floating cover 46 is generally level with the surrounding pavement.

Returning to FIG. 7, the drive mechanism further includes a drive member 66 including a drive plate 70 that travels over substantially the length of the base member 16, and that is positioned between the floating cover 46 and the inner and outer rails 26, 30. It is the passage of the drive plate 70 between the cover 46 and the inner and outer rails 26, 30 along the base member 16 that causes the cover 46 to be lifted locally.

The drive member 66 also includes two drive member legs 74 affixed to the underside of the drive plate 70, one at each transverse side of the drive plate 70, for supporting the drive plate 70 on the base member 16. The drive member legs 74 travel along the base member 16 outside of the outer rails 30. Each leg 74 includes a pin-receiving bore 78 therethrough (see FIG. 6).

The drive member 66 also includes a partial acme nut 82 affixed to the underside of the drive plate 70 and movably attached to the screw drive 54 such that the nut 82 and thus the drive plate 70 move translationally as the screw drive 54 rotates.

The wheel chocking device 10 further includes a power mechanism 58 for driving the screw drive 54 (see FIG. 1). The illustrated power mechanism 58 is an electric motor mounted adjacent the rear end of the base member 16. The motor 58 turns the screw 54 via a chain drive, belt drive, or other power transmission means. The power mechanism 58 may be mounted anywhere, including within or beneath the base member 16, provided it can turn the screw drive 54.

Additional details regarding the drive mechanism 54 and power mechanism 58 are contained in U.S. Pat. No. 6,250,432.

The wheel chocking device 10 further includes a collapsible chock 90 (see FIG. 2). The chock 90 has raised and lowered positions. The chock 90, when in the lowered position (as in FIGS. 3 and 5), lies generally flat on top of the cover 46 of the base member 16, allowing a truck to drive over the chock 90 and onto the device 10 as it backs to the loading dock 12. The chock 90, when in the raised position (as in FIGS. 2, 6, and 7), can block the tire 94 of a truck.

Figure 6:
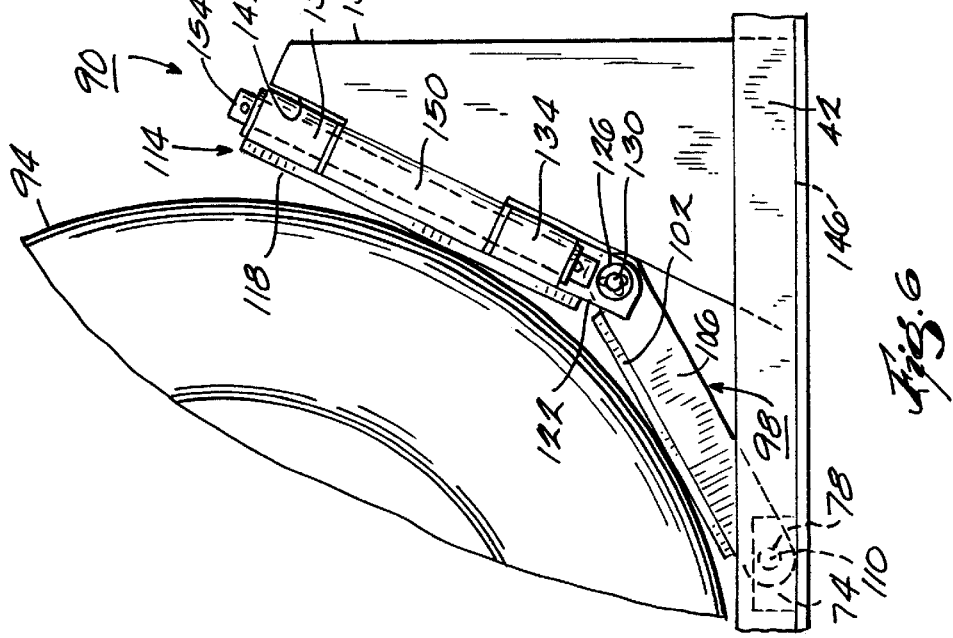
FIG. 6 is an elevation side view of the wheel chocking device of FIG. 1 in a raised position.

As best shown in FIG. 6, the chock 90 includes a lower chocking member 98 pivotably attached to the drive member 66. The lower chocking member 98 includes a lower chocking plate 102 and two side plates 106 affixed to the underside of the lower chocking plate 102, one at each transverse side of the lower chocking plate 102. Each side plate 106 includes a lower hinge bore (not shown) that is aligned with the pin-receiving bore 78 of each drive member leg 74. Hinge pins 110 extend through the lower hinge bores and the pin-receiving bores 78 such that the lower chocking member 98 is pivotably attached to the drive member 66. Each side plate 106 also includes an upper hinge bore (not shown).

The chock 90 further includes an upper chocking member 114 pivotably attached to the lower chocking member 98. The upper chocking member 114 includes an upper chocking plate 118 and two side plates 122 affixed to the underside of the upper chocking plate 118, one at each transverse side of the upper chocking plate 118. Each side plate 122 includes a lower hinge bore 126 therethrough that is aligned with the upper hinge bore of each lower chocking member side plate 106. Hinge pins 130 extend through the upper chocking member side plate lower hinge bores 126 and the lower chocking member side plate upper hinge bores such that the upper chocking member 114 is pivotably attached to the lower chocking member 98. The upper chocking member 114 also includes a first hinge section 134 affixed to each transverse side of the upper chocking plate 118.

The chock 90 further includes two support members in the form of two generally triangular support wings 138 pivotably attached to the upper chocking member 114. Each wing 138 has a forward edge 142 and a bottom edge 146. Each wing 138 includes a second hinge section 150 affixed to the forward edge 142. Hinge pins 154 extend through each first hinge section 134 of the upper chocking member 114 and each second hinge section 150 of the support wing 138 to form hinges such that each support wing 138 is pivotably attached to the upper chocking member 114. It should be appreciated that the illustrated orientation of the hinge is not critical to the invention. For example, the first hinge sections could be mounted to the support wings, and the second hinge section could be mounted to the upper chocking member 114.

As best illustrated in FIG. 5, each hinge pin 154 has an axis that is substantially parallel to the vertical plane defined by the acme screw 54. The axes and the upper chocking member 114 together are movable between a substantially horizontal orientation and an inclined orientation, where use of the term inclined encompasses any non-horizontal orientation including a vertical orientation.

When the chock 90 is in the lowered position as in FIG. 3, the lower and upper chocking members 98, 114 and the support wings 138 are generally horizontal and generally coplanar. In addition, the support wings 138 are arranged at least partially to the outside of the guide tracks 38 when the chock 90 is in the lowered position. In other words, the support wings 138 are arranged outwardly from the upper chocking member 114 when the chock 90 is in the lowered position. The support wings 138 allow the chock 90 to lie in a generally horizontal position when lowered so that a part of the driveway surface does not need to be excavated to store the chock 90.

When the chock 90 is in the raised position as in FIGS. 6 and 7, the upper chocking member 114 and the support wings 138 are inclined and the upper chocking member 114 is substantially perpendicular to each support wing 138. Again, use of the term inclined encompasses any non-horizontal orientation including a vertical orientation. The support wings 138 comprise the sides of the chock 90 when the chock 90 is in the raised position.

As shown in FIG. 4, the wheel chocking device 10 further includes a support wing guide system 160 including a first post guide 164 and a second post guide 168 on each transverse side of the base member 16. The first and second post guides 164, 168 are affixed to the base member 16 outside of the guide track 38. The first post guide 164 is affixed adjacent the guide track 38. The second guide post 168 is affixed toward the outside of and toward the front end from the first post guide 164.

The support wing guide system 160 also includes an elongated bar guide 172 on each transverse side of the base member 16. The bar guides 172 are affixed to the base member 16 toward the front end from guide track 38. Each bar guide 172 is affixed such that a portion extends outside of the guide track 38, and a portion is within the guide track 38 such that the support wing 138 will contact the bar guide 172 as the support wing 138 moves toward the front end.

In operation, the device 10 starts with the chock 90 in its lowered position (see FIGS. 3 and 5) lying generally horizontally on the cover 46 and in its furthermost position away from the dock 12. A vehicle enters the dock area and drives on top of the device 10 to the vehicle's docking position. The motor 58 is activated to turn the acme screw 54 and cause the drive member 66 under the floating cover 46 to move along the acme screw 54 toward the dock 12 in the direction 176 indicated in FIG. 5. This also moves the chock 90 because the chock 90 is coupled to the drive member 66. As illustrated in FIG. 4, as the chock 90 starts to move, the support wings 138 of the chock 90 contact the second and first post guides 168, 164, causing the wings 138 to deflect inward. The wings 138 rise as they deflect inward, which also raises the hinge axis and the upper chocking member 114. The lower chocking member 98 is also raised somewhat with the upper chocking member 114.

The chock 90 continues to rise to the raised position shown in FIG. 6. The wings 138 become the sides of the chock 90 and the chock 90 continues to move toward the truck tire 94. The wings 138 are guided and contained in the guide slots 50 between the cover 46 and the guide tracks 38, which keeps the chock 90 in the raised position. The chock 90 then contacts the tire 94 and the power mechanism 54 stops by reaching a predetermined current load, thus restraining the truck.

When the truck is ready to leave the dock 12, the process is reversed. The power mechanism 58 is operated to turn the acme screw 54 in the reverse direction, which causes the drive member 66 under the floating cover 46 to move along the acme screw 54 away from the dock 12, in a direction opposite direction 176 as shown in FIG. 5. Again, this also moves the chock 90 because the chock 90 is coupled to the drive member 66. The chock 90 remains in the raised position as the chock 90 moves away from the dock 12. As the chock 90 approaches its starting position, each wing 138 contacts a bar guide 172 that moves the wing 138 outward from the upper chocking member 114, allowing the chock 90 to lower to the chock's 90 generally horizontal lowered position.

In other embodiments (not shown), either or both of the lower and upper chocking members 98, 114 can be slightly raised when in the lowered position to ease the forces on the chock 90 when the wings 138 contact the second and first post guides 168, 164 and begin to raise.

In another embodiment (not shown), only one support wing 138 is hingedly attached to the underside of the upper chocking member 114 at some point at or between the transverse sides of the upper chocking member 114. The first and second post guides 164, 168 and the bar guide 172 are affixed to the base member 16 to align with the support wing 138, and may be between the guide tracks 38. In the lowered position, the wing 138 is generally parallel to and under the upper chocking member 114. In the raised position, the wing 138 is perpendicular to the upper chocking member 114.

In another embodiment (not shown), the drive mechanism 54 may be replaced by manual operation of the wheel chocking device 10.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A wheel-chocking device comprising:
   a base member; and
   a collapsible chock coupled to the base member and movable between lowered and raised positions, the chock including:
   a chocking member movable relative to the base member, and
   a support member pivotably attached to the chocking member and defining therewith a pivot axis, the pivot axis and the chocking member being movable between a substantially horizontal orientation and an inclined orientation.

2. The device of claim 1, the chocking member and the support member being substantially coplanar when the chock is in the lowered position, and the chocking member and the support member being inclined and substantially perpendicular to each other when the chock is in the raised position.

3. The device of claim 1, the base member having a longitudinal axis that defines a vertical plane, the pivot axis being substantially parallel to the vertical plane.

4. The device of claim 1, further comprising a support member guide system including
- a first guide affixed to the base member for directing the support member toward the inclined orientation as the chocking member moves in a first direction, and
- a second guide affixed to the base member for directing the support member toward the horizontal orientation as the chocking member moves in a second direction opposite the first direction.

5. The device of claim 1, further comprising a second support member pivotably attached to the chocking member and defining therewith a second pivot axis, the second pivot axis being substantially parallel to the pivot axis.

6. A wheel-chocking device comprising:
- a base member; and
- a collapsible chock movable relative to the base member between lowered and raised positions, the chock including:
  - a chocking member movable relative to the base member, and
  - a support member pivotably attached to the chocking member, the chocking member and the support member being generally coplanar when the chock is in the lowered position, and the chocking member and the support member being inclined and substantially perpendicular to each other when the chock is in the raised position, the support member defining with the chocking member a pivot axis, the pivot axis and the chocking member being movable between a substantially horizontal orientation and an inclined orientation.

7. The device of claim 6, the base member having a longitudinal axis that defines a vertical plane, the pivot axis being substantially parallel to the vertical plane.

8. The device of claim 6, further comprising a support member guide system including
- a first guide affixed to the base member for directing the support member toward the inclined orientation as the chocking member moves in a first direction, and
- a second guide affixed to the base member for directing the support member toward the horizontal orientation as the chocking member moves in a second direction opposite the first direction.

9. The device of claim 6, further comprising a second support member pivotably attached to the chocking member, the chocking member and the second support member being generally coplanar when the chock is in the lowered position, and the chocking member and the second support member being inclined and substantially perpendicular to each other when the chock is in the raised position.

10. A wheel-chocking device comprising:
- a base member;
- a chocking member movable relative to the base member;
- a support member pivotably attached to the chocking member and movable between a substantially horizontal orientation and an inclined orientation; and
- a support member guide system including:
  - a first guide affixed to the base member for directing the support member toward the inclined orientation as the chocking member moves in a first direction, and
  - a second guide affixed to the base member for directing the support member toward the horizontal orientation as the chocking member moves in a second direction opposite the first direction.

11. The device of claims 10, the base member having a longitudinal axis that defines a vertical plane, the support member defining with the chocking member a pivot axis, the pivot axis being substantially parallel to the vertical plane.

12. The device of claim 10, further comprising a second support member pivotably attached to the chocking member and movable between a substantially horizontal orientation and an inclined orientation.

\* \* \* \* \*